Patented Sept. 19, 1922.

1,429,782

UNITED STATES PATENT OFFICE.

HUGO SCHWEITZER, OF LEVERKUSEN, NEAR COLOGNE, GERMANY, ASSIGNOR TO FARBENFABRIKEN VORM. FRIEDR. BAYER AND CO., OF LEVERKUSEN, NEAR COLOGNE-ON-THE-RHINE, GERMANY.

REDDISH-VIOLET MONOAZO DYE FOR WOOL.

No Drawing.   Application filed August 3, 1921.   Serial No. 490,782.

*To all whom it may concern:*

Be it known that I, HUGO SCHWEITZER, citizen of the German Empire, residing at Leverkusen, near Cologne, Germany, have invented new and useful Improvements in Reddish-Violet Monoazo Dyes for Wool (for which I have filed applications in Germany, Feb. 19, 1916, Patent Number 298,432; Austria, Feb. 5, 1917, Patent Number 87,334; Switzerland, June 3, 1920, Patent Number 88,562; France, May 12, 1920, Patent Number 515,442; and in England, May 6, 1920, Patent Number 164,218), of which the following is a specification.

I have found that new and valuable azo-dyes can be obtained by combining diazo compounds of 4-nitranilin-2-sulfamids having most probably the following general formula

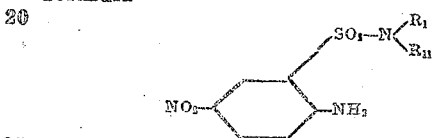

($R_1$ includes hydrogen and alkyl and aryl, such as $-H$, $-CH_3$, $-C_2H_5$; $-C_6H_5$ and $R_{11}$ stands for a hydrocarbon radicle e. g. $-CH_3$; $-C_2H_5$: $-C_6H_5$), with a 2-naphthylaminesulfonic acid compound, such as 2-naphthylamine-8-sulfonic acid, 2-naphthylamine-6.8-disulfonic acid, ortho anisyl-2-naphthylamine-8-sulfonic acid.

My new dyes in the form of their salts with alkali metals after being dried and pulverized are dark powders soluble in water generally with a red to violet and in concentrated sulfuric acid with an orange-red coloration. Upon reduction with tin and hydrochloric acid a paraphenylendiamin derivative having most probably the formula:

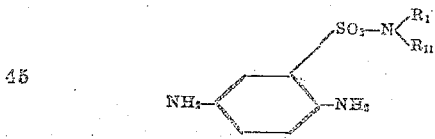

and a 1.2-diaminonaphthalenesulfonic acid compound are obtained. They dye wool from acid baths even, from red to violet shades fast to light and fulling.

In order to illustrate the new process more fully the following example is given, the parts being by weight:—321 parts of 4-nitranilin-2-sulfethylanilid are dissolved in 300 parts of glacial acetic acid and are diazotized with 110 parts of hydrochloric acid and 69 parts of sodium nitrite. The diazo solution is then added to a solution of 223 parts of 2-naphthylamine-8-sulfonic acid in water containing an excess of sodium acetate. The dye is salted out, treated with sodium carbonate, filtered off and dried.

It has, in a free state, most probably the formula:

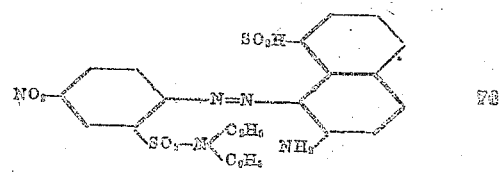

In the form of its sodium salt after being dried and pulverized it is a dark powder soluble in concentrated sulfuric acid with an orange-red coloration. Upon treating it with tin and hydrochloric acid it is split up into 1.4-diaminobenzene-2-ethylphenylsulfamid and 1.2-diaminonaphthalene-8-sulfonic acid. It dyes wool from acid bath reddish-violet shades fast to light and fulling. Other of the above mentioned 4-nitranilinsulfamids can be used, such as 4-nitranilin-2-sulfanilid, 4-nitranilin-2-sulfdiphenylamid, 4-nitranilin-2-sulfmethylanilid or 4-nitranilin-2-sulfdimethylamid.

I claim:—

1. The herein described new azo dyes which, in the form of their dried and pulverized salts with alkali metals, are dark powders soluble in water generally with a red to violet and in concentrated sulfuric acid with an orange-red coloration; yielding upon reduction with tin and hydrochloric acid a substituted paraphenylenediaminsulfamid and a 1.2-diaminonaphthalenesulfonic acid compound; and dyeing wool from red to violet shades fast to light and fulling, substantially as described.

2. The herein described new azo dye having in a free state most probably the following formula:

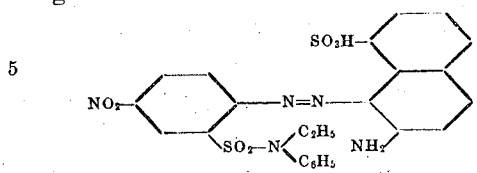

being in the form of its dried and pulverized sodium salt a dark powder soluble in concentrated sulfuric acid with an orange-red coloration; yielding upon reduction with tin and hydrochloric acid 1.4-diaminobenzene-2-ethylphenylsulfamid and 1.2-diaminonaphthalene-8-sulfonic acid, and dyeing wool from acid baths reddish-violet shades fast to light and fulling, substantially as described.

In testimony whereof I have hereunto set my hand in the presence of two subscribing witnesses.

HUGO SCHWEITZER.

Witnesses:
HELEN NUFER,
FRANCES NUFER.